United States Patent
Lopez (10) Patent No.: US 9,026,637 B2
(45) Date of Patent: *May 5, 2015

(54) REMOTELY MANAGING ENTERPRISE RESOURCES

(71) Applicant: Service Bureau Intetel, S.A., Buenos Aires (AR)

(72) Inventor: Claudio Marcelo Lopez, Buenos Aires (AR)

(73) Assignee: Service Bureau Intetel S.A., Buenos Aires (AR)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,553

(22) Filed: Dec. 23, 2013

(65) Prior Publication Data

US 2014/0115184 A1   Apr. 24, 2014

Related U.S. Application Data

(63) Continuation of application No. 12/763,927, filed on Apr. 20, 2010, now Pat. No. 8,615,576, which is a continuation of application No. 11/840,118, filed on Aug. 16, 2007, now Pat. No. 7,702,773.

(60) Provisional application No. 60/891,695, filed on Feb. 26, 2007.

(51) Int. Cl.
| | | |
|---|---|---|
| G06F 15/173 | (2006.01) | |
| H04L 29/08 | (2006.01) | |
| G06Q 10/00 | (2012.01) | |
| H04L 12/24 | (2006.01) | |

(52) U.S. Cl.
CPC ............... *H04L 67/06* (2013.01); *G06Q 10/00* (2013.01); *H04L 41/0213* (2013.01); *H04L 41/12* (2013.01); *H04L 67/125* (2013.01)

(58) Field of Classification Search
USPC .................................. 709/223–224, 238, 217
See application file for complete search history.

(56) References Cited

U.S. PATENT DOCUMENTS

| | | | |
|---|---|---|---|
| 6,829,596 | B1 | 12/2004 | Frazee |
| 7,376,969 | B1 | 5/2008 | Njemanze et al. |
| 8,074,213 | B1 * | 12/2011 | Holtz ............................. 717/172 |
| 8,615,576 | B2 * | 12/2013 | Lopez ............................ 709/223 |
| 2002/0111884 | A1 | 8/2002 | Groat et al. |
| 2003/0118353 | A1 | 6/2003 | Baller et al. |
| 2004/0148184 | A1 * | 7/2004 | Sadiq ................................ 705/1 |
| 2008/0040244 | A1 | 2/2008 | Ricciuti et al. |
| 2008/0183603 | A1 | 7/2008 | Kothari et al. |

* cited by examiner

*Primary Examiner* — Philip B Tran
(74) *Attorney, Agent, or Firm* — Fish & Richardson P.C.

(57) ABSTRACT

The present disclosure is directed to a system and method for remotely managing enterprise resources. In some implementations, a method includes remotely receiving information associated with heterogeneous assets in an enterprise network. Transactions for remotely managing the heterogeneous assets are generated in response to at least the information. The management transactions are stored remote from the enterprise network until a request for the management transactions is received from the enterprise network. The management transactions are transmitted to the enterprise network using a single interface.

18 Claims, 5 Drawing Sheets

REMOTELY MANAGING ENTERPRISE RESOURCES

CLAIM OF PRIORITY

This application is a continuation of U.S. application Ser. No. 12/763,927, filed on Apr. 20, 2010, which claims priority to U.S. application Ser. No. 11/840,118, filed on Aug. 16, 2007, which claims priority under 35 USC §119(e) to U.S. application Ser. No. 60/891,695, filed on Feb. 26, 2007, the entire contents of which are hereby incorporated by reference.

TECHNICAL FIELD

This invention relates to communication networks and, more particularly, to remotely managing enterprise resources.

BACKGROUND

Managing assets in an enterprise network can be challenging and is generally fundamental to the overall success of the enterprise. The effect of errors in operation can vary depending on its severity and the nature of the error or the effected asset. Examples are loss from disruption of service, unauthorized use of resources, as well as others. Maintaining an effective system for mitigating errors in operations of an enterprise network, however, can be difficult due to a changing nature of security threats, shortages of information component (IT) resources, implementation difficulties, and other issues.

SUMMARY

The present disclosure is directed to a system and method for remotely managing enterprise resources. In some implementations, a method includes remotely receiving information associated with heterogeneous assets in an enterprise network. Transactions for remotely managing the heterogeneous assets are generated in response to at least the information. The management transactions are stored remote from the enterprise network until a request for the management transactions is received from the enterprise network. The management transactions are transmitted to the enterprise network using a single interface.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
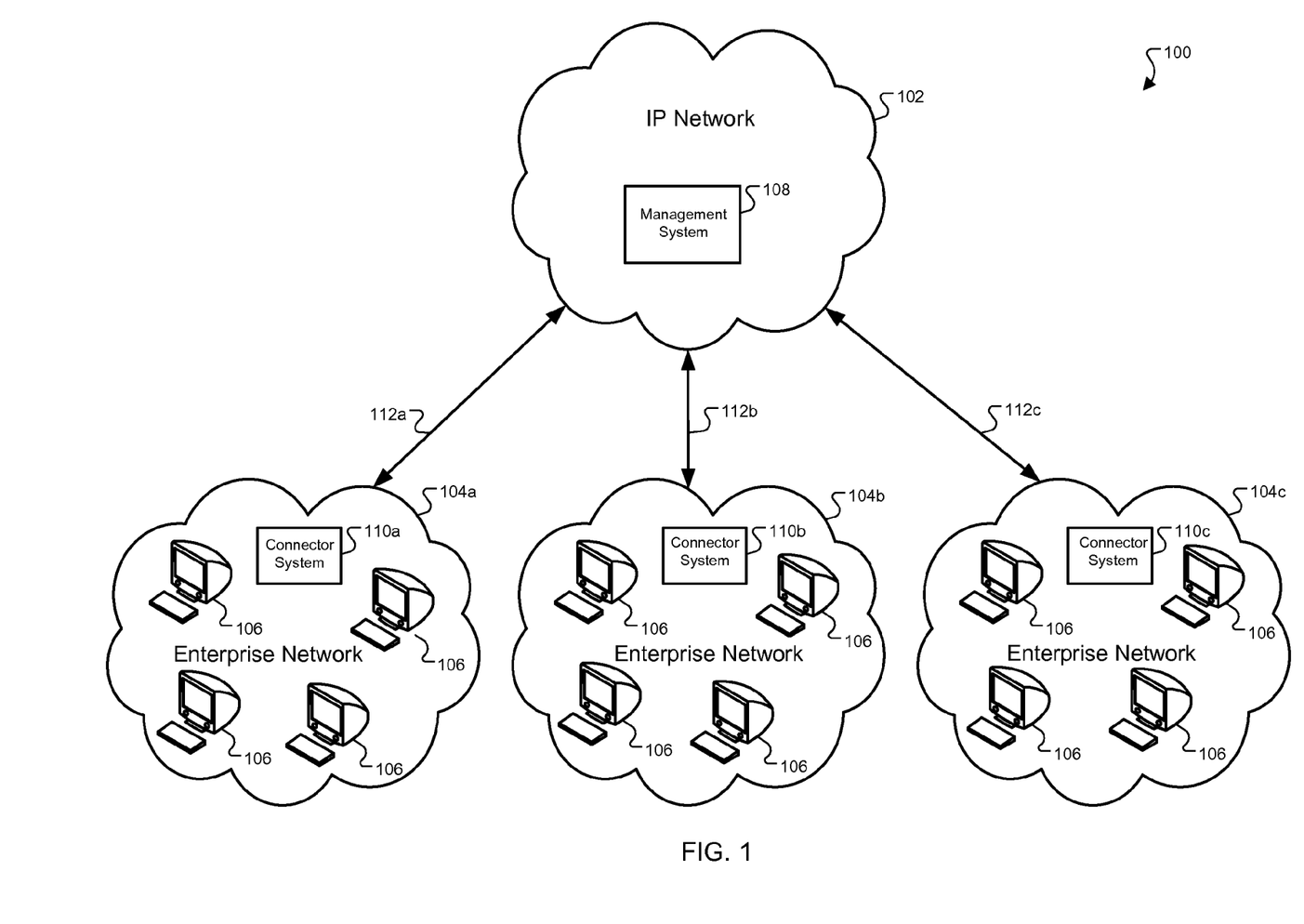
FIG. 1 is an example system for remotely managing heterogeneous assets.

FIG. 1 illustrates a system 100 for remotely managing heterogeneous assets 106 in enterprise networks 104a-c. For example, the system 100 may remotely manage the heterogeneous assets 106 using a single interface for each enterprise network 104. In other words, the system 100 may not include a plurality of different interfaces to transmit management transactions to the heterogeneous assets 106. Transaction request can include downloading new connectors, new configuration files, new binaries, as well as other requests. At a high level, the system 100 is all or a portion of a distributed environment comprising an Internet Protocol (IP) network 102 and enterprise networks 104a-c including a plurality of assets 106. In general, the IP network 102 transmits, to the enterprise network 104, transaction requests and automatically converts the received transactions to forms compatible with the appropriate assets 106 such as native commands. For example, the IP network 102 can transmit an upgrade request for specific printers in the enterprise network 104, and in response to at least receiving the request, the system 100 can automatically translate, map, or otherwise convert the request to commands compatible with the specific printers. In some implementations, the system 100 may convert request to a different protocol and/or a different syntax. In some implementations, the system 100 may provide one or more of the following: a way of accessing remote system without opening incoming security holes at customer's network; enable an automation engine to execute management transaction without human intervention; and/or allow a service provider to manage multiple platforms, in multiple customers from a unique management system.

Turning to a detailed description of the system 100, the IP network 102 facilitates wireless or wireline communication between a management system 108 and any other local or remote computer, such as enterprise networks 104. The network 108 may be continuous or segmented without departing from the scope of this disclosure, so long as at least portion of the network 104 may facilitate communications between a management system 108 and one or more of the enterprise networks 104. In other words, the network 104 encompasses any internal or external network, networks, sub-network, or combination thereof operable to facilitate communications between various computing components in the system 100. The network 102 may communicate, for example, IP packets, Frame Relay frames, Asynchronous Transfer Mode (ATM) cells, voice, video, data, and other suitable information between network addresses. The network 102 may include one or more local area networks (LANs), radio access networks (RANs), metropolitan area networks (MANs), wide area networks (WANs), all or a portion of the global computer network known as the Internet, and/or any other communication system or systems at one or more locations. In illustrated implementation, the network 102 includes the management system 108 communicably couple with the enterprise networks 104a-c.

The management system 108 can included in software, hardware, and/or firmware configured to remotely manage the heterogeneous assets 106 in the enterprise networks 104a-c. For example, the management system 108 may transmit management transactions to the enterprise network 104 in response to at least a request. In some implementations, the management system 108 performs one or more of the following: receives information (e.g., requests, asset information) from the enterprise networks 104, generate management transactions in response to an event (e.g., request), transmit any management transactions to the enterprise network using a single interface, and/or generate reports regarding the management of the assets 106. In regards to receiving information, the management system 108 can, in some implementations, be configured to remotely store the management transactions until a request from the enterprise network 104 is received. In other words, the management system 108, in this implementation, only transmits the management transactions to the enterprise network 104 in response to a request from the enterprise network 104. In some implementations, the management system 108 generates management transactions for the assets 106 in response to an event. The event may include a request from a user, the enterprise network 104, and/or the network 102. In some implementations, the management system 108 automatically generates management transactions in response to at least receiving operational data associated with the assets 106. For example, the operational data may indicate that an update to the enterprise network 104, errors in operating, errors in some of the ports of the system, errors in some of the boards of the system. In some implementations, the management system 108 uses a single interface 112 to communicate with the assets 106. In doing so, the management system 108 eliminates, minimizes, or otherwise reduces the number of interfaces 112 used to manage the heterogeneous assets 106. For example, the management system 108 may transmit information such as management transactions using a single communication protocol. As mentioned above, the management system 108 may, in some implementations, only transmit information such as management transactions in response to requests from the enterprise network 104. In this implementation, the management transactions are carried out by the enterprise networks 104. In some instances, the security of the network 104 is not compromised in order to manage the assets 106 remotely. In regards to reports, the management system 108 may generate one or more reports indicating information associated with the heterogeneous assets 106. For example, the reports may indicate one or more of the following: operational data, time that the transaction was generated, time that the transaction was executed, time that the transaction was finished, data, asset type, date in which the transaction was generated, time required to execute the transaction, log of how the transaction was executed, process ID, results, amount of times the transaction was executed until it was satisfactory finished.

The enterprise networks 104*a*-*c* are networks associated with enterprises. Each enterprise may comprise a corporate or business entity, a government body, a non-profit institution, or any other organization with the assets 106 and at least one connector system 110. The enterprise may be the owner of at least some of the assets 106 and the connector system 110. Of course, the enterprise may also lease the assets 106 and/or connector system 110 or may hire contractors or agents who are responsible for maintaining, configuring, controlling, and/or managing the assets 106 and/or the connector system 110. In some implementations, a remote third party manages the services provided by the assets 106 through the IP network 102. In the illustrated implementation, the enterprise network 104 facilitates wireless and/or wireline communication between assets 106, the connector system 110, and other enterprise elements. The enterprise network 104 may communicate, for example, IP packets, Frame Relay frames, ATM cells, voice, video, data, and other suitable information between network addresses. In addition, while the enterprise network 104 is illustrated as a single network, the enterprise network 104 may comprise a plurality of networks. Also, the enterprise network 104 may comprises different types of networks compatible with different protocols without departing from the scope of this disclosure.

The assets 106 comprise devices associated with the enterprise and may include computers, switches, servers, routers, printers, data storage devices, a personal computer, a workstation, network computer, kiosk, wireless data port, personal data assistant (PDA), telephones, one or more processors within these or other devices, or any other suitable processing device. In some implementations, groups of assets 106 or all assets 106 in the enterprise network 104 may be associated with a specific connector system 110. Each asset 106 executes, references, includes, or is otherwise associated with software, hardware, firmware, a combination of the foregoing or other component of asset 106. For example, such components may be applications running on an asset 106 such as, for example, web browsers, operating systems, word-processing applications, or any other suitable programs. In another example, such components may also comprise databases, peripherals, network or hardware devices (e.g., memory, printer, external hard drive, switch, router, hub, modem, other). As used herein, "asset 106" and "component of asset 106" may be used interchangeably as appropriate.

The connector system 110 can include any software, hardware, and/or firmware configured to map, translate, or otherwise convert management transactions to forwards compatible with the heterogeneous assets 106. For example, the connector system 110 may receive one or more management transactions for certain assets 106 and map the include information (e.g., identifier) to commands native to the associated asset 106. In some implementations, the connector system 110 performs one or more of the following: transmits request for management transactions to the management system 108, receives management transactions from the management system 108, converts the management transactions to a form compatible with the associated asset 106, and/or transmit information associated with the operation of the assets 106 to the management system 108. In some implementations, the connector system 110 transmits request for management transaction using a single interface 112. In this implementation, the connector system 110 can use a single communication protocol to transmit such request to the management system 108. In some implementations, the interface 112 can be based on a web service structure using, for example, the SOAP-XML protocol. In this case, the interface can support any of the messaging patterns used by the protocol, being the most common the RPC pattern. In response to at least receiving the requested management transactions from the management system 108, the connector system 110 may convert the management transactions to forms compatible with the heterogeneous assets 106. For example, the connector system 110 may convert each transaction to one of a plurality of different communication protocols and/or syntaxes. Such protocols may include telnet, ssh, http, SOAP, CIM/XML, RLOGIN, SNMP and/or others. In addition, the connector system 110 can, in some implementations, request, retrieve, or otherwise receive information associated with the assets 106. For example, such information may include a vendor, model type, operating parameters (e.g., amount of boards, status of the ports, license limits, level of activity of the CPU, capacity limits, traffic), as well as other information. The connector system 110 may transmit the asset information to the management system 108 using the single interface 112. In some instances, the connector system 110 periodically transmits the information to the management system 108. In some instances, the connector system 110 transmits the asset information in response to an event in the enterprise network.

In one aspect of operation, the connector system 110 receives information associated with the heterogeneous assets 106 and converts the information to a form compatible with the management system 108. In response to an event (e.g., period of time, update to the enterprise network 104, occurrence of an error in the asset 106), the connector system 110 transmits the asset information to the management system 108. Using the received information, the management system 108 can, in some implementations, generate reports indicating information associated with the assets 106 such operational status of the assets 106. These reports may be generated automatically such as in response to a user request, expiration of a period of time, receiving information indicating an error in the asset 106, and/or any other suitable event. In some implementations, the management system 108 generates management transactions in response to at least the asset information. For example, a user of the management system 106 may submit a request for a management transaction in response to at least a generated report and/or information received from the connector system 110. In some implementation, the management system 108 can be prevented from transmitting management transactions to the connector system 110 independent of previously receiving a request. In response to at least receiving a request, the management system 108 can, in some implementations, identify previously generated management transactions and transmit the stored transactions to the connector system 110. In some implementations, the transaction request merely includes information identifying native commands to be executed by the associated asset 106. For example, the management transactions may include identifiers corresponding to native commands. In this example, the connector system 110 maps the identifier to the appropriate command. In some implementations, the management system 108 transmits the command in one protocol and the connector system 110 translates the command to a different protocol prior to transmitting the command to the appropriate asset 106. In response to at least receiving the management transactions, the connector system 110 generates management transactions compatible with the associated assets 106. For example, the connector system 110 may identify one or more locally stored commands native to the assets 106 using information (e.g., identifier) included in the receive management transactions. In another example, the connector system 110 may convert received transactions to forms compatible with the assets 106.

Figure 2:
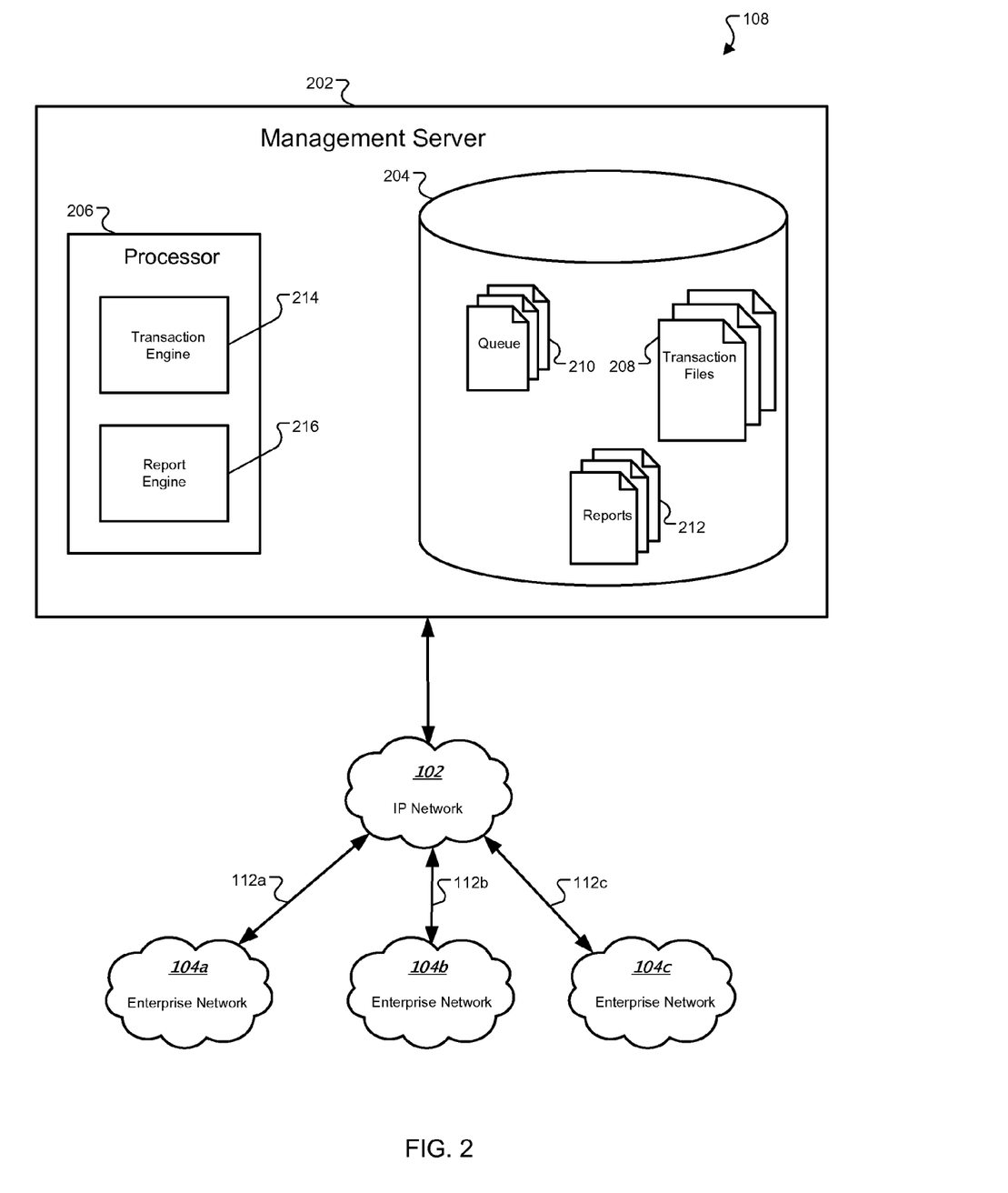
FIG. 2 is an example management system of FIG. 1.

FIG. 2 illustrates an example management system 108 for remotely managing the heterogeneous assets 106. In the example shown, the management system 108 comprises a single management server 202 in the IP network 102, though other configurations are possible. In the illustrated implementation, the management server 202 comprises an electronic computing device operable to receive, transmit, process and store data associated with the system 100. The system 100 can be implemented using computers other than servers, as well as a server pool. Indeed, the management server 202 may be any computer, electronic or processing device such as, for example, a blade server, general-purpose personal computer (PC), Macintosh, workstation, Unix-based computer, or any other suitable device. In other words, the system 100 may include computers other than general purpose computers as well as computers without conventional operating systems. The management server 202 may be adapted to execute any operating system including Linux, UNIX, Windows Server, or any other suitable operating system.

In the illustrated implementation, the management server 202 includes memory 204 and a processor 206. The memory 204 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, the memory 204 includes transaction files 208, a queue 210 and reports 212. Though, the memory 204 can, in some implementations, include other data without departing from the scope of this disclosure. The transaction files 208 comprises instructions, mappings, algorithms, or any other directive used to identify management transactions for assets 106. For example, the transaction file 208 may include identifiers for commands native to the assets 106. In another example, the transaction file 208 may include other information associated with such management transactions. Such information may include one or more of the following: a vendor, a model, parameters, a transaction ID, a method ID, an asset ID, and/or other information. Each transaction file 208 may be associated with a single asset 106 or multiple assets 106 may be associated with a single transaction file 208. For example, the transaction file 208 may be associated with a type of asset. Transaction file 208 may be any suitable format such as, for example, a text file, binary file, an XML document, a flat file, a comma-separated-value (CSV) file, a name-value pair file, a Structured Query Language (SQL) table, one or more libraries, or others as long as management system 108 can remotely manage heterogeneous assets 106. In some embodiments, the transaction files 208 are implemented as a computer file using keywords and variables describing commands associated the assets 106. Transaction files 208 may be dynamically created or populated by management server 202, a third-party vendor, any suitable user of server 202, loaded from a default file, or received via network 102. The term "dynamically" as used herein, generally means that the appropriate processing is determined at run-time based upon the appropriate information.

Based, at least in part, on the transaction files 208, the queue 210 includes one or more data structures or entries for storing management transactions generated by the management server 202. For example, the queue 210 may store management transactions prior to the management server 202 receiving a request for such transactions. The queue 210 may include one or more of the following: date, time, asset ID, management transaction, enterprise ID, transaction parameters, ID of the 110, ID of the 104, priority. Transaction file 208 may be any suitable format such as, for example, a text file, binary file, an XML document, a flat file, a CSV file, a name-value pair file, a SQL table, one or more libraries, or others as long as management server 202 can remotely manage heterogeneous assets 106. In some embodiments, the transaction files 208 are implemented as a computer file using keywords and variables describing commands associated assets 106. Transaction files 208 may be dynamically created or populated by management server 202, a third-party vendor, any suitable user of server 202, loaded from a default file, or received via network 102.

The reports 212 include one or more entries or data structures that identify information associated with one or more assets 106. For example, the report 212 may identify operational information regarding a specific asset 106 in the enterprise network 104. The report 212 may be based or otherwise associated with one or more criteria. For example, the report 212 may be associated with one or more of the following criteria: an enterprise, an asset type, a specific asset, management transactions, a user, a group of users, and/or other criteria. In some implementations, the report 212 includes aggregated errors and management transactions issued for a period of time. In addition, the report 212 may include information identifying management transactions that may be executed in response to the displayed information. For example, the report 212 may enable an administrator to issue a software update command to an associated asset 106. The report 212 may be any suitable format such as, for example, a text file, binary file, an XML document, a flat file, a CSV file, a name-value pair file, a SQL table, one or more libraries, or others as long as management server 202 can present information associated with the assets 106. The report 212 may be dynamically created or populated by the management server 202 as information is received by the connector system 110.

Processor 206 executes instructions and manipulates data to perform operations of the evaluation server 202. Although FIG. 1 illustrates a single processor 206 in server 202, multiple processors 206 may be used according to particular needs, and reference to processor 206 is meant to include multiple processors 206 where applicable. In the illustrated implementation, processor 206 executes a transaction engine 214 and a report engine 216 at any appropriate time such as, for example, in response to a request or input from a user of the server 202 or any appropriate system coupled with the network 102. The transaction engine 214 includes any software, hardware, and/or firmware, or combination thereof, operable to generate management transactions for the heterogeneous assets 106. For example, the transaction engine 214 may identify a transaction file 208 associated with an asset 106, generate a management transaction for the asset 106, and store the management transaction in the queue 210 until a request is received. In some implementations, the transaction engine 214 may perform one or more of the following: receive requests to generate one or more management transactions for assets 106, identify one or more transaction files 208 associated with the assets 106, generate the one or more management transaction based, at least in part, on the identified transaction files 208, store the management transactions in the queue 210, and/or transmit the stored transactions in response to a request from the connector server 110.

Reporting engine 216 includes any suitable hardware, software, firmware, or combination thereof operable to generate reports 212 in response to any suitable event. For example, the reporting engine 216 may receive a request to generate a report 212 for a particular asset 106 from a user of server 202 and generate one or more reports 212 for the asset 106 in response to at least the request. In some embodiments, the reporting engine 216 retrieves or otherwise receive asset information from the connector system 110 in accordance with one or more parameters. The parameters may include a period, asset type, a user, a group, a specific asset 106 or any other suitable criteria. Reports 212 may include one or more of the following: asset ID, operation information (e.g., errors in some of the ports of the system, errors in some of the boards of the system), executed management transactions, vendor, model, date, time, and/or other parameters, date in which the transaction was generated, time required to execute the transaction, log of how the transaction was executed, process ID, results, amount of times the transaction was executed until it was satisfactory finished. In addition to displaying the reports 216, the reporting engine 216 may also provide interactive elements such that the user may execute an action (e.g., management transaction) in response to the displayed report 216. For example, the reporting engine 216 may enable the user to update software for an asset 106.

Regardless of the particular implementation, "software" may include software, firmware, wired or programmed hardware, or any combination thereof as appropriate. Indeed, transaction engine 214 and reporting engine 216 may be written or described in any appropriate computer language including C, C++, Java, J#, Visual Basic, assembler, Perl, any suitable version of 4GL, as well as others. It will be understood that while transaction engine 214 and reporting engine 216 are illustrated in FIG. 2 as including individual modules, each of transaction engine 214 and reporting engine 216 may include numerous other sub-modules or may instead be a single multi-tasked module that implements the various features and functionality through various objects, methods, or other processes. Further, while illustrated as internal to server 202, one or more processes associated with transaction engine 214 and reporting engine 216 may be stored, referenced, or executed remotely. Moreover, transaction engine 214 and reporting engine 216 may be a child or sub-module of another software module or enterprise application (not illustrated) without departing from the scope of this disclosure.

Figure 3:
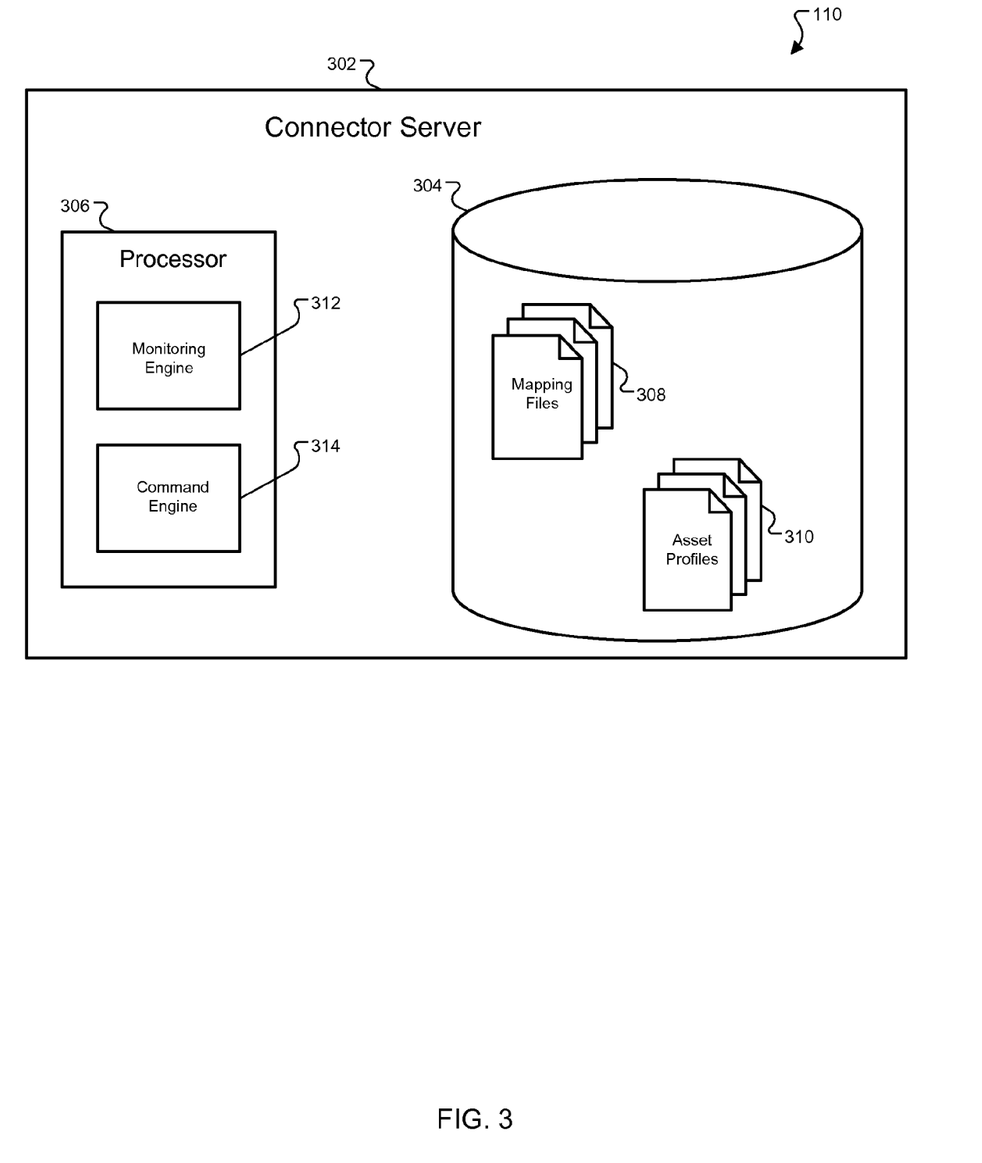
FIG. 3 is an example connector system of FIG. 1.

FIG. 3 is an example connector system 110 for automatically executing management transactions. In the example shown, the connector system 110 comprises a single connector server 302 in the enterprise network 104, though other configurations are possible. In the illustrated implementation, the connector server 302 comprises an electronic computing device operable to receive, transmit, process and store data associated with the system 100. The system 100 can be implemented using computers other than servers, as well as a server pool. Indeed, the connector server 302 may be any computer, electronic or processing device such as, for example, a blade server, general-purpose PC, Macintosh, workstation, Unix-based computer, or any other suitable device. In other words, the system 100 may include computers other than general purpose computers as well as computers without conventional operating systems. The connector server 302 may be adapted to execute any operating system including Linux, UNIX, Windows Server, or any other suitable operating system.

In the illustrated implementation, the connector server 302 includes memory 304 and a processor 306. The memory 304 may be a local memory and include any memory or database module and may take the form of volatile or non-volatile memory including, without limitation, magnetic media, optical media, RAM, ROM, removable media, or any other suitable local or remote memory component. In the illustrated implementation, the memory 304 includes mapping files 308 and asset profiles 310. Though, the memory 304 can, in some implementations, include other data without departing from the scope of this disclosure. Mapping file 308 includes instructions, data mappings, algorithms, or any other directive used by connector server 302 to map information to one or more commands compatible with the heterogeneous assets 106. For example, the mapping file 308 may map an identifier to one or more commands compatible an asset 106. In some implementations, the mapping files 308 map identifiers to commands that execute substantially the same function. For example, the mapping file 308 may map an identifier associated with a laptop and an identifier associated with a PDA to commands that updates software. In some implementations, the mapping file 308 may include one or more of the following: a command, a syntax, an executable, an asset ID, an asset type, a method ID, parameters of the variables, script, transaction IDs, transaction types. Mapping file 308 may be any suitable format such as, for example, an XML document, a flat file, CSV file, a name-value pair file, SQL table, an array, an object, or others. Mapping file 308 may be any suitable data structure such as an array, matrix, list, table, or any other suitable structure that maps a management transaction to one or more commands compatible with assets 106 in the enterprise network 104. Mapping file 308 may be dynamically created or populated by connector server 302, a third-party vendor, any suitable user of connector server 302, loaded from a default file, or received via the enterprise network 104.

Asset profiles 310 includes one or more entries or data structures that describes a profile of an asset 106 and/or a group of assets 106. For example, an asset profile 310 may include, indicate, or reference one or more of the following:

an asset name, an asset ID, an asset type, previously executed management transactions, an associated group name, a manufacturer name, a model name, a component name, a component version, a configuration setting, networking information, and/or any other suitable information used to identify one or more information associated with one or more assets 106. For example, the asset profile 310 may identify a name of an application and version executed by a specific asset 106. In addition, asset profile 310 may be associated with a specific asset 106 or multiple assets 106 may be associated with the asset profile 310. Asset profiles 310 may be stored in any suitable format such as, for example, an XML document, a flat file, CSV file, a name-value pair file, SQL table, or others. Indeed, each profile 116 may be a temporary or a persistent data structure without departing from the scope of the disclosure. Asset profiles 310 are typically generated or loaded based on data or other configuration information received or retrieved from the assets 106. But the asset profiles 310 may also be created, updated, or supplied by the server 302, a third-party software vendor, or any appropriate user of any computer in the system 100, loaded from a default profile, or received via network 102 or 104.

Processor 306 executes instructions and manipulates data to perform operations of the connector server 302. Although FIG. 1 illustrates a single processor 306 in server 302, multiple processors 306 may be used according to particular needs, and reference to processor 306 is meant to include multiple processors 306 where applicable. In the illustrated implementation, the processor 306 executes a monitoring engine 312 and a command engine 314 at any appropriate time such as, for example, in response to a request or input from a user of the server 302 or any appropriate system coupled with the network 104. The monitoring engine 312 can include any software, hardware, and/or firmware, or combination thereof, operable to communicate with the management system 108 and/or assets 106. For example, the monitoring engine 312 may transmit request for management transactions to the management system 108. In some implementations, the monitoring engine 312 may execute one or more of the following: retrieve or otherwise receive information from the assets 106 in the enterprise network 104, generate and/or update asset profiles 310 with asset information, transmit asset information to the management system 108, update asset profiles 310 with information identifying executed transactions, and/or others. In response to at least receiving information, the monitoring engine 312 map generate and/or update one or more profiles 310 associated with the asset 106 using the information. In some implementations, the monitoring engine 312 can query the asset 106 for operational data such as processor load, temperature, errors, as well as other parameters and update the profile 310 with the received operational data. In addition, the monitoring engine 312 may communicate with the management system 108. For example, the monitoring engine 312 may periodically transmit information included in or otherwise identified by the asset profiles 310. In some implementations, the monitoring engine 312 may request management transactions from the management system 108 in response to an event. For example, the monitoring engine 312 may request the transactions in response to receiving information from one or more assets identifying an error in operation. In some examples, the monitoring engine 312 periodically transmits requests for transactions to the management system 108.

The command engine 314 can include any software, hardware, and/or firmware, or combination thereof, operable to automatically transmit management transactions to the assets 106. For example, the command engine 314 may map transactions received from the management system 108 to transactions compatible with the associate assets. In some implementations, the command engine 314 may execute one or more of the following: receive management transactions from the management system 108, identify identifiers associated with native commands using the received transactions, map the identifiers to one or more native commands using the mapping files 308, and/or automatically transmit the native commands to the appropriate assets 106. In response to at least receiving a management transaction, the command engine 314 can, in some implementation, identify one or more mapping files 308 using the transaction. For example, the transaction may include information that identifies an asset 106, a command, as well as other information. In this example, the command engine 314 may locate, retrieve or otherwise identify commands compatible with the asset 106 using the mapping file 308. In some implementations, the command engine 314 automatically transmits the native commands to the assets 106.

Figure 4:
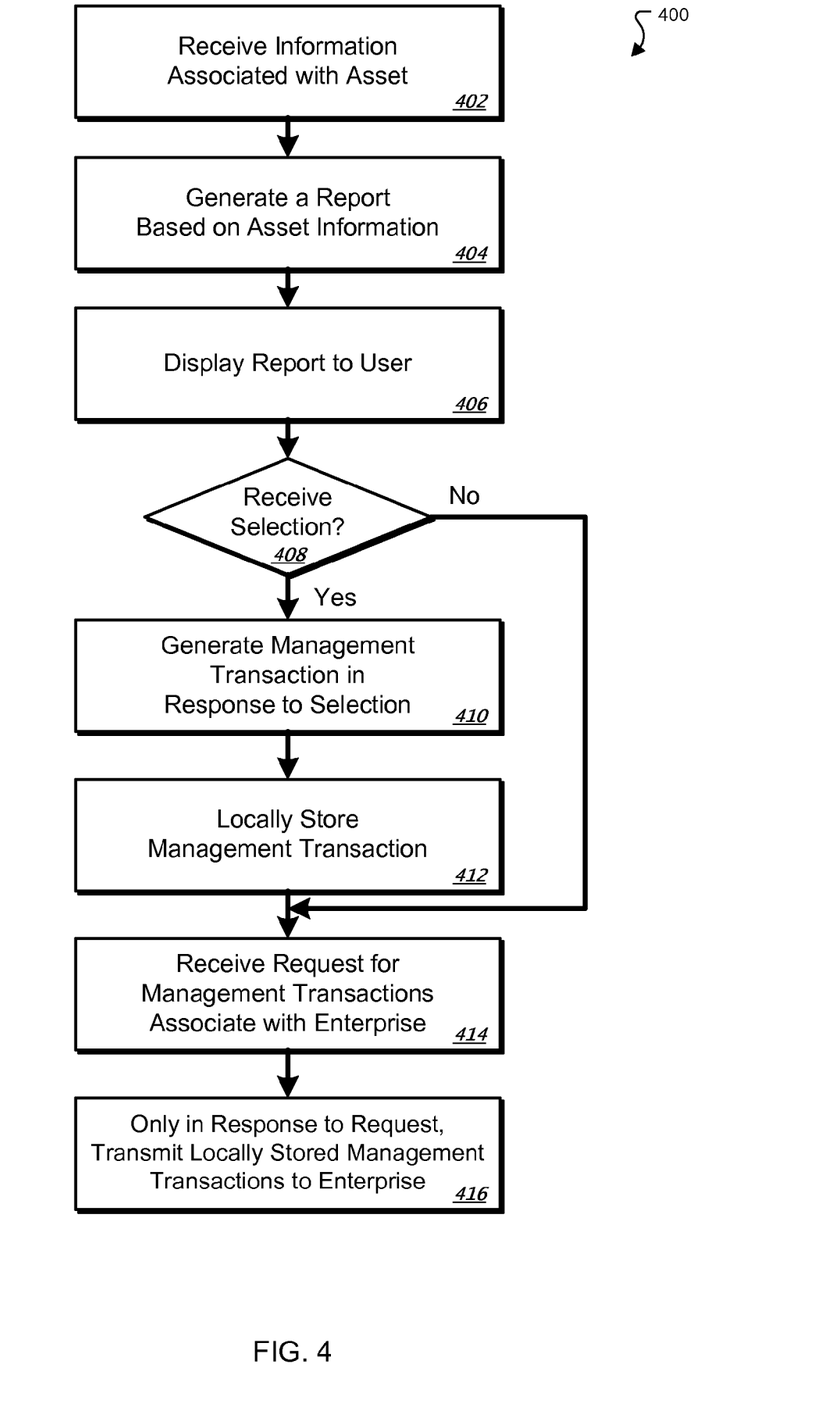
FIG. 4 is a flow chart illustrating an example method for remotely managing heterogeneous assets.

FIG. 4 is a block diagram illustrating an example method for remotely management heterogeneous assets in an enterprise network. Generally, the method 400 describes automatically transmitting management transactions in response. The method 400 contemplates using any appropriate combination and arrangement of logical elements implementing some or all of the described functionality.

The method 400 includes the following two high-level processes: (1) generating reports associated with assets using information received from the enterprise network from step 402 to 406; and (2) automatically transmitting management transactions in response to at least a request from the enterprise network from steps 408 to 416. The method 400 begins at step 402 where information associated with assets is received. For example, the management system 108 may receive, from the connector system 110, information including operational data of one or more assets 106 in the enterprise network 104. At step 404, a report of the asset is generated based, at least in part, on the received information. In the example, the reporting engine 216 may generate a report 212 for the asset 106 using the received information. Next, the report is displayed to the user at step 406. Again in the example, the reporting engine 216 may present the report 212 to the user such that the user may make one or more selections in response to at least the displayed information.

Turning to the management-transaction process, if the user makes a selection at decisional step 408, then, at step 410, at least one management transaction is generated in response to at least the selection. In the example, the transaction engine 214 may identify one or more transaction files 208 associated with the asset and generate a management transaction based, at least in part, on the identified transaction files 208. The management transaction is locally stored at step 412. As for the example, the transaction engine 214 may locally store the management transaction in queue 210. Next, at step 414, a request for management transactions for assets in the enterprise network is received. Only in response to the received request, the locally stored management transaction is transmitted to the enterprise network at step 416. Again returning to the example, the transaction engine 214 identifies management transactions associated with the enterprise network 104 in the queue 308 and transmits the identified management transactions only in response to the request.

Figure 5:
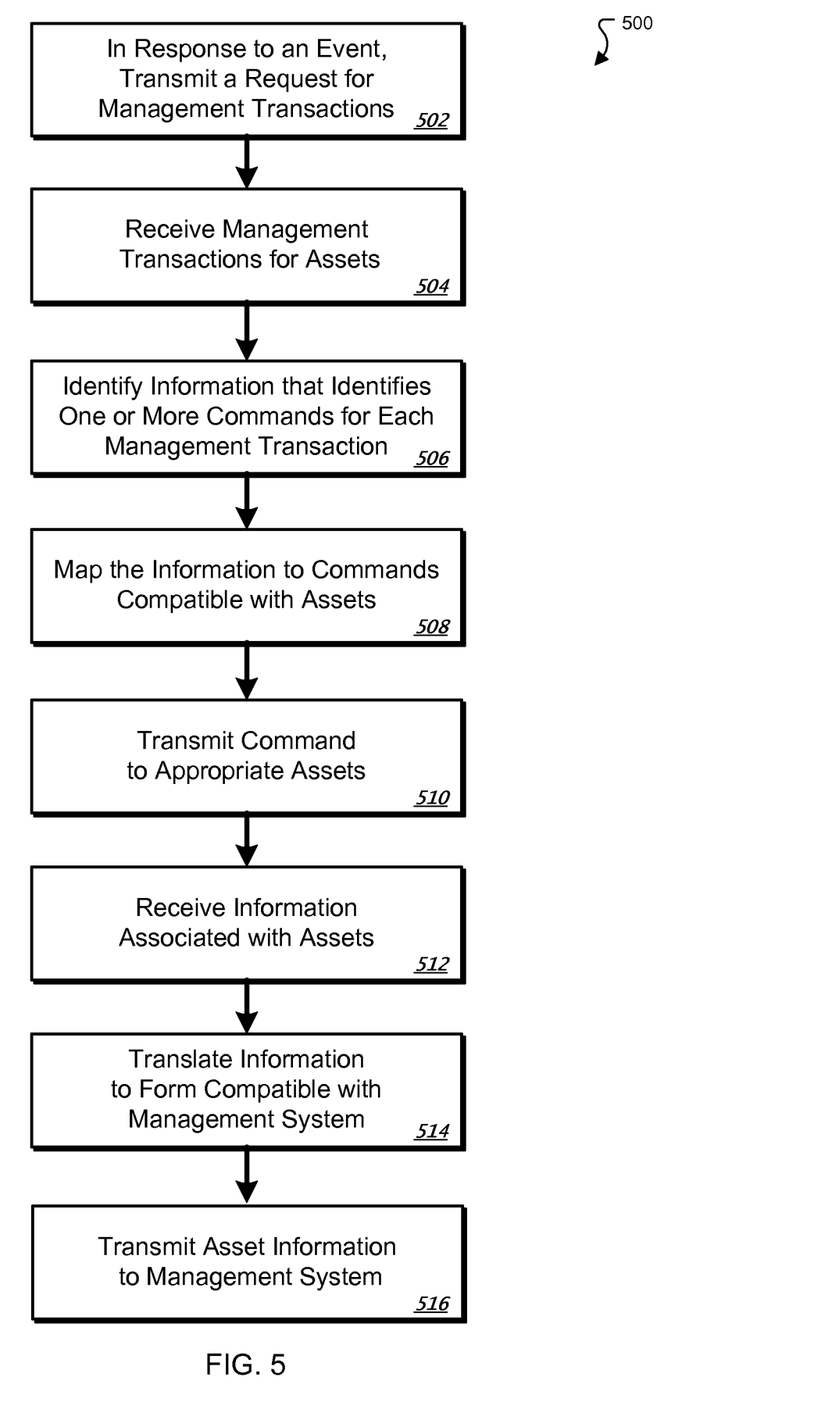
FIG. 5 is a flow chart illustrating an example system for automatically executing management transactions.

FIG. 5 is a flow chart illustrating an example method for automatically executing management transactions. Generally, the method 500 describes automatically mapping the received transactions to forms compatible with the assets and transmitting the mapped transactions to forms compatible with the assets. The method 500 contemplates using any appropriate combination and arrangement of logical elements implementing some or all of the described functionality.

Method 500 begins at step 502 where a request for management transactions is transmitted to a remote management service in response to an event. For example, the connector server 402 may transmit a request for management transactions in response to at least an update to the enterprise network 104. At step 504, the requested management transactions are received. Next, at step 506, information identifying one or more native commands is identified using the management transactions. In the example, the command engine 314 may identify identifiers included in the management transactions that identify or can be used to identify commands native to the associated assets 106. The information is mapped to one or more commands native to the associated assets at step 508. Again returning to the example, the command engine 314 identifies one or more command files 308 associated with the identified assets 106 and, using the command files, maps the identifiers to one or more commands native to the identified assets 106. At step 510, the native commands are transmitted to the appropriate assets in the enterprise network. In the example, the command engine 314 may identify network addresses of the assets 106 and transmit the native commands to the assets 106 using the network addresses. Next, at step 512, information associated with assets in the enterprise network is received. As for the example, the monitoring engine 312 may periodically receive information (e.g., operational data) from the heterogeneous assets 106 in the enterprise network 104. The received information is translated to a form compatible with the management system 108 at step 514 and, at step 516, transmitted to the management system at step 516. Again in the example, the monitoring engine 312 identifies one or more command files 308 associated with the assets 106 and translates the received information to a form compatible with the management system 108 using the identified command files 308. The monitoring engine 312 transmits the asset information to the management system 108.

A number of embodiments of the invention have been described. Nevertheless, it will be understood that various modifications may be made without departing from the spirit and scope of the invention.

What is claimed is:

1. A method for managing assets, comprising:
   retrieving, from heterogeneous assets in the enterprise network, status information identifying versions of data stored in the heterogeneous assets;
   transmitting, by at least one designated device in an enterprise network, the status information to a management system external to the enterprise network using at least one designated interface for the enterprise networks;
   receiving, through the at least one designated interface for the enterprise networks, commands to remotely manage the heterogeneous assets in accordance with one or more updates, the commands are instructions to update the data stored in the heterogeneous assets and incompatible with the heterogeneous assets; and
   translating the incompatible commands to commands compatible with the heterogeneous assets; and
   transmitting the commands compatible to the heterogeneous assets.

2. The method of claim 1, the commands for the heterogeneous assets are generated in accordance with a single communication protocol.

3. The method of claim 1, the at least one designated device in the enterprise network generates compatible commands for a plurality of different types of devices.

4. The method of claim 1, wherein the incompatible commands and the compatible commands are encoded in different protocols.

5. The method of claim 1, further comprising:
   transmitting information from the at least one designated device identifying statuses of the heterogeneous assets; and
   receiving one or more reports for the heterogeneous assets based, at least in part, on the received information.

6. The method of claim 5, further comprising:
   transmitting a selection from the user through an interactive element presented with the one or more viewable reports; and
   receiving at least one or more commands for at least one of the heterogeneous assets in response to at least the selection.

7. A system, comprising:
   one or more devices configured to:
      retrieve, from heterogeneous assets in the enterprise network, status information identifying versions of data stored in the heterogeneous assets;
      transmit, by at least one designated device in an enterprise network, the status information to a management system external to the enterprise network using at least one designated interface for the enterprise networks;
      receive, through the at least one designated interface for the enterprise networks, commands to remotely manage the heterogeneous assets in accordance with one or more updates, the commands are instructions to update the data stored in the heterogeneous assets and incompatible with the heterogeneous assets; and
      translate the incompatible commands to commands compatible with the heterogeneous assets; and
      transmit the commands compatible to the heterogeneous assets.

8. The system of claim 7, the commands for the heterogeneous assets are generated in accordance with a single communication protocol.

9. The system of claim 7, the at least one designated device in the enterprise network generates compatible commands for a plurality of different types of devices.

10. The system of claim 7, wherein the incompatible commands and the compatible commands are encoded in different protocols.

11. The system of claim 7, the one or more devices further configured to:
    transmit information from the at least one designated device identifying statuses of the heterogeneous assets; and
    receive one or more reports for the heterogeneous assets based, at least in part, on the received information.

12. The system of claim 11, the one or more devices further configured to:
    transmit a selection from the user through an interactive element presented with the one or more viewable reports; and
    receive at least one or more commands for at least one of the heterogeneous assets in response to at least the selection.

13. A computer program product encoded on a non-transitory medium, the product comprising computer readable instructions for causing one or more processors to perform operations comprising:
    retrieving, from heterogeneous assets in the enterprise network, status information identifying versions of data stored in the heterogeneous assets;

transmitting, by at least one designated device in an enterprise network, the status information to a management system external to the enterprise network using at least one designated interface for the enterprise networks;

receiving, through the at least one designated interface for the enterprise networks, commands to remotely manage the heterogeneous assets in accordance with one or more updates, the commands are instructions to update the data stored in the heterogeneous assets and incompatible with the heterogeneous assets; and translating the incompatible commands to commands compatible with the heterogeneous assets; and transmitting the commands compatible to the heterogeneous assets.

14. The computer program product of claim 13, the commands for the heterogeneous assets are generated in accordance with a single communication protocol.

15. The computer program product of claim 13, the at least one designated device in the enterprise network generates compatible commands for a plurality of different types of devices.

16. The computer program product of claim 13, wherein the incompatible commands and the compatible commands are encoded in different protocols.

17. The computer program product of claim 13, the instructions further comprising:

transmitting information from the at least one designated device identifying statuses of the heterogeneous assets; and receiving one or more reports for the heterogeneous assets based, at least in part, on the received information.

18. The computer program product of claim 17, the instructions further comprising:

transmitting a selection from the user through an interactive element presented with the one or more viewable reports; and receiving at least one or more commands for at least one of the heterogeneous assets in response to at least the selection.

* * * * *